(12) United States Patent
Mukerjee et al.

(10) Patent No.: US 10,662,364 B2
(45) Date of Patent: May 26, 2020

(54) DRILLING FLUIDS CONTAINING POLYESTER POLYOLS

(71) Applicant: RESINATE MATERIALS GROUP, INC., Plymouth, MI (US)

(72) Inventors: Shakti L. Mukerjee, Canton, MI (US); Kevin Anthony Rogers, Farmington, MI (US); Rick Tabor, Plymouth, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 0 days.

(21) Appl. No.: 15/559,151

(22) PCT Filed: Mar. 16, 2016

(86) PCT No.: PCT/US2016/022541
§ 371 (c)(1),
(2) Date: Sep. 18, 2017

(87) PCT Pub. No.: WO2016/153866
PCT Pub. Date: Sep. 29, 2016

(65) Prior Publication Data
US 2018/0066174 A1  Mar. 8, 2018

Related U.S. Application Data

(60) Provisional application No. 62/136,306, filed on Mar. 20, 2015.

(51) Int. Cl.
*C09K 8/34* (2006.01)
*E21B 21/00* (2006.01)
*C09K 8/32* (2006.01)
*C09K 8/035* (2006.01)

(52) U.S. Cl.
CPC ............... *C09K 8/34* (2013.01); *C09K 8/035* (2013.01); *C09K 8/32* (2013.01); *E21B 21/00* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 5,602,082 | A | 2/1997 | Hale et al. |
| 5,698,502 | A | 12/1997 | Pafford et al. |
| 6,632,779 | B1 | 10/2003 | Vollmer et al. |
| 7,238,647 | B2 | 7/2007 | Hayet et al. |
| 7,608,567 | B2 | 10/2009 | Saini |
| 7,662,753 | B2 | 2/2010 | Saini |
| 7,667,315 | B2 | 2/2010 | Ohsumi |

(Continued)

FOREIGN PATENT DOCUMENTS

CN  102617083 B  1/2014

OTHER PUBLICATIONS

PCT International Search Report and Written Opinion dated Sep. 16, 2016 from corresponding Application No. PCT/US2016/025541, 17 pages.

*Primary Examiner* — Jeffrey D Washville
(74) *Attorney, Agent, or Firm* — Dilworth IP, LLC

(57) ABSTRACT

A drilling fluid comprising a carrier fluid, an aromatic polyester polyol and an additive selected from a thickener, a wetting agent, an emulsifier, a weighting agent, a pH control agent, a lubricant or mixtures thereof.

26 Claims, 3 Drawing Sheets

(56) References Cited

U.S. PATENT DOCUMENTS

| | | |
|---|---|---|
| 8,148,305 B2 | 4/2012 | Westfechtel et al. |
| 8,236,735 B2 | 8/2012 | Maker et al. |
| 2003/0176290 A1 | 9/2003 | Rayborn |
| 2010/0048935 A1 | 2/2010 | Mijolovic et al. |
| 2010/0300694 A1* | 12/2010 | Vonderhagen .......... A61K 8/02 166/311 |
| 2010/0305009 A1 | 12/2010 | Westfechtel et al. |
| 2012/0202723 A1 | 8/2012 | Abbey et al. |
| 2013/0267445 A1 | 10/2013 | Hendrickson |
| 2014/0329987 A1 | 11/2014 | Gurtler et al. |

* cited by examiner

DRILLING FLUIDS CONTAINING POLYESTER POLYOLS

FIELD OF THE INVENTION

The invention relates to oil field drilling fluids. More particularly, the invention relates to oil field drilling fluids containing a polyester polyol.

BACKGROUND OF THE INVENTION

In a relatively short period of time, advances made in the area of enhanced oil recovery, e.g., hydraulic fracturing, have vaulted the United States into its position as the world's leader in natural gas production. In the next few years, the U.S. will likely assume the same status with regard to oil production. This expansion in energy production will be aided by the use of oil field drilling fluids. Such fluids serve a variety of key functions in the oil drilling process, such as removing cuttings from the borehole, cooling and lubricating the drill bit, controlling drilling formation pressures, maintaining wellbore stability, and transmitting hydraulic energy to the drilling bit. Modern drilling fluid design typically incorporates a variety of additives, such as weighting agents, viscosifiers, and lubricants to facilitate the drilling process. Various chemicals have been used as drilling fluid additives. Of these, polyols have been used in a variety of functions. U.S. Pat. No. 5,698,502 discloses lubricants which are the reaction product of polyols having unconverted hydroxyl groups with branched/linear acids. U.S. Pat. No. 6,632,779 discloses a viscosifier including polyols selected from glycerol, glycols and polyglycols. U.S. Pat. Nos. 8,236,735 and 8,148,305 disclose drilling fluid lubricants containing polyol esters, where the polyol component is an oligoglycerol or alkoxylate of oligoglycerides. U.S. Patent Publication No. 2013/0267445 discloses antifoaming agents for drilling fluids containing polyols having first and second primary hydroxyl groups, such as glycerols. U.S. Pat. No. 7,238,647 discloses drilling fluid additives where polyols such as glycerol, diglycerols, polyglycerides, pentaerythritol, ethylene glycol and polyethylene glycol are used to form partial esters. U.S. Pat. Nos. 7,608,567, 7,677,315, and 7,662,753 disclose degradable surfactants for treating subterranean formations, where a polyol is used as a hydrophilic block of the degradable block copolymer. U.S. Pat. No. 5,602,082 discloses drilling fluids for improving the osmotic efficiency of shale during drilling containing ethoxylated/propoxylated polyols. U.S. Patent Publication No. 2012/0202723 discloses drilling fluid lubricants containing polyols that comprise poly-hydroxy functional aliphatic alcohols, where the hydroxyl groups are attached to the main chain via methylol moieties. Nevertheless, a continuing need exists for improved oil field drilling fluid additives since these can increase drilling fluid performance and production rates. In particular, a need continues to exist for drilling fluid additives that are based on sustainable technologies. It has unexpectedly been found that polyester polyols provide good performance as a drilling fluid additive or carrier fluid.

SUMMARY OF THE INVENTION

The invention relates to oil field drilling fluid components containing polyester polyols.

In one embodiment, the present disclosure provides a drilling fluid comprising a carrier fluid, an aromatic polyester polyol, and an additive selected from a thickener, a wetting agent, an emulsifier, a weighting agent, a pH control agent, a lubricant or mixtures thereof.

In an alternate embodiment, the present disclosure provides a carrier fluid comprising a non-aqueous liquid selected from diesel, diesel fuel no. 1, diesel fuel no. 2, diesel fuel no. 4, paraffins, olefins, aromatics, crude oil, vegetable oils, esters of vegetable oils or mixtures thereof; and a polyester polyol selected from aliphatic polyester polyols, aromatic polyester polyols, and hydrogenated aromatic polyester polyols or mixtures thereof.

In still another alternative embodiment, the present disclosure provides a thickener for a drilling fluid selected from aromatic polyester polyols, hydrogenated aromatic polyester polyols or combinations thereof.

In an alternate embodiment, the present disclosure provides a process for thickening a drilling fluid, the process comprising adding a thickener to the drilling fluid, the thickener being selected from aromatic polyester polyols, hydrogenated aromatic polyester polyols or combinations thereof.

In another alternate embodiment, the present disclosure provides a process comprising combining a carrier fluid; an aromatic polyester polyol; and an additive selected from a thickener, a wetting agent, an emulsifier, a weighting agent, a pH control agent, a lubricant or mixtures thereof, thereby forming a drilling fluid.

In still another alternate embodiment, the present disclosure provides a process comprising drilling a wellbore with a drilling fluid comprising a carrier fluid; an aromatic polyester polyol; and an additive selected from a thickener, a wetting agent, an emulsifier, a weighting agent, a pH control agent, a lubricant or mixtures thereof.

In an alternate embodiment, the present disclosure provides a drilling fluid comprising an aromatic polyester polyol and an additive selected from a thickener, a wetting agent, an emulsifier, a weighting agent, a pH control agent, a lubricant or mixtures thereof.

BRIEF DESCRIPTION OF THE DRAWINGS

The invention will be more fully understood from the following detailed description, taken in connection with the accompanying drawings, in which.

DETAILED DESCRIPTION OF THE INVENTION

Figure 1:
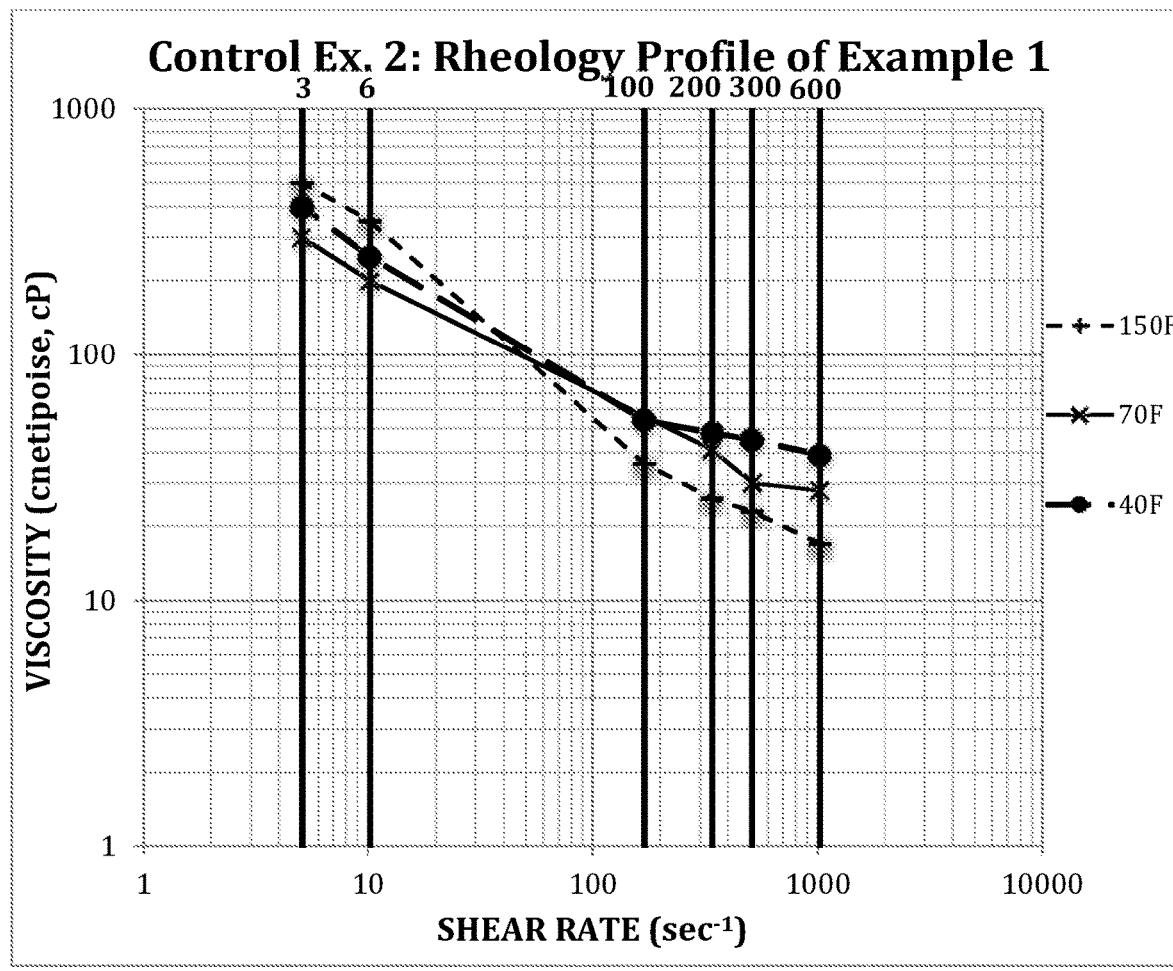
FIG. 1 illustrates the viscosity profile plot of Control Example 2.

The drilling fluids of the present specification contain polyester polyol-based carrier fluids or drilling fluid additives.

Polyester Polyols

The polyester polyols used in the drilling fluid compositions of the present disclosure can be aromatic polyester polyols produced with aromatic polyester sources or aliphatic polyester polyols produced with aliphatic polyester sources. The aromatic polyester polyols can also be hydrogenated to form hydrogenated aromatic polyester polyols. Preferably, the polyester polyols are aromatic polyester polyols.

Aromatic Polyester Polyols

When the polyester polyols are aromatic polyester polyols, an aromatic polyacid source such as, for example, a thermoplastic polyester can be reacted with a glycol and preferably also a hydrophobe to form the aromatic polyester polyol. Examples of such thermoplastic polyesters include polyethylene terephthalate (PET), polybutylene terephthalate, polytrimethylene terephthalate, glycol-modified polyethylene terephthalate, copolymers of terephthalic acid and 1,4-cyclohexanedimethanol, isophthalic acid-modified copolymers of terephthalic acid and 1,4- cyclohexanedimethanol, copolymers of 2,5-furandicarboxylic acid, or copolymers of 2,5- dialkyl 2,5,furandicarboxylates, or combinations thereof.

Other aromatic polyacid sources can be used to react with glycols to form the above-described aromatic polyester polyols. Examples of such materials include phthalic acid, terephthalic acid, isophthalic acid, and orthophthalic acid; the anhydrides derived therefrom, such as phthalic anhydride; the esters and alkyl esters derived therefrom, including dialkyl phthalates such as dimethyl phthalates, dialkyl terephthalates such as dimethyl terephthalates, dialkyl isophthalates such as dimethyl isophthalates; trimellitic acid, trimellitic anhydride, trimethyl trimelliate, naphthalene dicarboxylic acid, pyromellitic anhydride, 2,5-furandicarboxylic acid, dialkyl 2,5- furandiarboxylates, pyromellitic acid, dimethyl naphthalene dicarboxylate, and mixtures thereof. Preferably, the polyacid source is PET.

Preferably, the aromatic polyester polyols are derived from a recycled source, due to its ready availability and sustainable nature. More preferably, they are derived from a recycled PET stream, where the recycle stream containing recycled PET material is digested in a glycol stream and preferably reacted with a hydrophobe. The recycle stream may contain recycled PET carpet, recycled PET containers, recycled PET textiles, recycled PET articles or mixtures thereof. In each case, the recycled PET bottles, carpet, containers or articles are post-industrial or post-consumer materials.

PET Containers

When the recycle stream is PET containers, they preferably are PET bottles. The bottles typically originate from recycling centers where the recycled bottles are compressed into bottle bales that are typically held in place by baling wire, and are mounted on pallets for transportation.

Recycled PET Carpet

When the recycle stream is recycled PET carpet, the fibers typically originate as post-industrial off-grade or defective recycle carpet, greige goods, or fiber products and post-consumer recycle carpet. In the case of post-consumer recycled carpet, the carpet is typically collected by carpet un-installers for use as a recycle stream Recycled PET and Fabric or Textile When the recycle stream is PET textile or fabric, the material typically originates as post-industrial off-grade or scrap, and can contain dyes and other contaminants. Post industrial off-grade might originate from incorrectly dyed fabric or incorrectly woven textiles. Post industrial scrap can originate from leftover fabric that results from cutting fabric during the manufacture of clothing, carpet, furniture, shoes, curtains, and other articles that use PET. Post consumer recycling of PET can occur by utilizing worn-out polyester clothing from apparel and uniform manufacturers and retailers as well as government agencies, hospitals and clinics, schools, sports clubs, and other entities.

Preferably, when a recycle stream containing PET is used to prepare the polyester polyol, the stream contains at least 83.0 wt % PET, and preferably near 100% PET if the recycle stream has previously been processed into pellets prior to use., preferably present as recycled PET bottles.

Aliphatic Polyester Polyols

When the polyester polyols are aliphatic polyester polyols, they are preferably derived from aliphatic polyacid sources, where the aliphatic polyacid source is reacted with a glycol stream and preferably also a hydrophobe. Examples include the mono- or dialkyl esters of maleic anhydride or succinic anhydride, the mono-or dialkyl esters of succinic acid, maleic acid, lactic acid, fumaric acid, suberic acid, sebacic acid, azelaic acid, adipic acid, malonic acid, glutaric acid, nonandioic acid, nonenedioic acid, sebacic acid, decenedioic acid, dodecanedioic acid, dodecenedioic acid, tetradecanedioic acid, tetradecenedioic acid, hexadecanedioic acid, octadecanedioic acid, decenedioic or its mono- or dialkyl esters, and mixtures thereof. Preferably, the aliphatic polyacid source is selected from adipic acid, suberic acid, sebacic acid, succinic acid, nonanedioic acid, octadecanedioic acid, decenedioic hexadecanedioic acid or its mono- or dialkyl esters, and mixtures thereof.

Hydrogenated Aromatic Polyester Polyols

The aromatic polyester polyols described above can be further hydrogenated by employing a hydrogenation catalyst in the presence of hydrogen gas in a high pressure reactor. Typical hydrogenation catalysts used for such processes are Pt or Pd over carbon.

Drilling fluid thickeners can be prepared from the hydrogenated aromatic polyester polyols, aromatic polyester polyols or mixtures thereof. It has been found that hydrogenating the aromatic polyester polyol to produce the aliphatic derivative results in a significant decrease in the viscosity of the resultant polyol. The decrease in viscosity can be several orders of magnitude, and allows the aliphatic polyester polyol to be used as a replacement for conventional carrier fluids. Typical commercial carrier fluids are materials such as Escaid-110, available from ExxonMobil and Amodrill-1000, available from Ineos. Viscosities of these fluids are typically below 50 cP at ambient temperature. The aliphatic polyester polyols produced by hydrogenating the aromatic polyester polyols exhibit similar viscosities, and can therefore be employed as replacements for the carrier fluids.

The above-described polyester polyols can be used as drilling fluid carrier fluids or as a drilling fluid additive; in particular, as a drilling fluid thickener/viscosifier. When the polyester polyols are drilling fluid additives, they are added to the drilling fluid in an amount from 1.0 to 25.0 lb/bbl of drilling fluid, preferably, from 2.0 to 20.0 lb/bbl of drilling fluid, and more preferably, 3.0 to 14.0 lb/bbl. Such additives can be used along with other conventional drilling fluid additives in the drilling fluid, as discussed below. When the polyester polyols are used as a carrier fluid, they are added to the drilling fluid in an amount from 60.0 to 100.0 vol % of the liquid phase of the drilling fluid, preferably in an amount from 70.0 to 85.0 vol % of the liquid phase of the drilling fluid. The polyester polyol-based carrier fluid can be used along with conventional additives in the drilling fluid.

Mixtures of Polyester Polyols

The polyester polyols of the current disclosure may comprise mixtures of aromatic polyesters, aliphatic polyesters and hydrogenated polyesters, or mixtures or copolymers of the above-described diacid derivatives.

Glycols

Glycols suitable for use are well known. By "glycol," is meant a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, erythritol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexane-dimethanol, 1,3-cyclohexanedimethanol, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Preferably, the glycol is selected from propylene glycol, 2-methyl-1,3-propanediol, 3-methyl-1,5-pentanediol, neopentyl glycol, diethylene glycol, polyethylene glycol having a number average molecular weight of about 200, and mixtures thereof. In a preferred embodiment, the glycol is a recycled glycol, especially recycled propylene glycol and recycled diethylene glycol. Propylene glycol recovered from used deicing fluids is one example. In another preferred embodiment, the glycol is a recycled ethylene glycol, which may be recovered from used engine antifreeze or coolant.

Hydrophobes

The polyols in the digested material may be reacted with hydrophobes so that the polyols can incorporate recurring units from the hydrophobes. The hydrophobes are reacted into the polyester polyol within the range of 2.0 to 70.0 wt %, preferably, 3.0 to 60.0 wt %, and more preferably, 4.0 to 50.0 wt %, based on the total weight of the polyester polyol.

Suitable hydrophobes for reaction with the polyols are selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof.

Preferably, the hydrophobe is selected from dimer fatty acids, ricinoleic acid, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols; cardanol-based products, recycled cooking oil, hydroxy-functional materials derived from epoxidized, ozonized, or hydroformylated fatty esters or acids, or mixtures thereof. More preferably, the hydrophobe is selected from dimer fatty acids, ricinoleic acid, corn oil, canola oil, soybean oil, castor oil, triglycerides or alkyl carboxylate esters having saturated or unsaturated $C_8$-$C_{20}$ fatty acid units, saturated or unsaturated $C_8$-$C_{20}$ fatty acids, alkoxylated castor oil, saturated or unsaturated $C_9$-$C_{18}$ dicarboxylic acids, cardanol- based products, hydroxy-functional materials derived from epoxidized, ozonized, or hydroformylated fatty esters or acids, or mixtures thereof.

When the polyester polyol is used as a carrier fluid, the hydrophobe reacted with the polyol can also be a mono-functional carboxylic acid or fatty ester selected from oleic acid, methyl oleate, 2-ethylhexanoic acid, ISOCARB® acids from Sasol, Versatic™ acids from Hexion, ethyl oleate, octanoic acid, methyl octanoate, ethyl octanoate, nonanoic acid, methyl nonanoate, ethyl nonanoate, $C_8$-$C_{18}$ methyl or ethyl esters of fatty acids, or mixtures thereof. These materials facilitate decreasing the polyol's viscosity, and may be added to the reaction after a di- or tri- functional hydrophobe is added. If no hydrophobe is used, then the mono-functional carboxylic acid or fatty ester can be reacted with the digested material after reaction with the glycol. Preferably the mono- functional reactants are saturated fatty acids or esters with a density less than 1.0 g/m L. The afore-mentioned mono-functional acids are examples of the mono-functional components that could be used in this regard.

Glycol Reaction (Digestion)

The polyacid source is reacted with the glycol and optionally a hydrophobe. In the reaction, the reactants are heated within the range of 80° C. to 260° C., alternately 100° C. to 250° C., 130° C. to 240° C., or 160° C. to 230° C., optionally in the presence of a catalyst, to form a digested stream and optionally, a non-digested stream. Typically, the reaction is run at atmospheric pressure, although the reaction can be run at pressures between about 0 psia to about 100 psia, about 5 psia to about 75 psia, or about 7 psia to about 65 psia. In those instances where it is desirable to remove water, reduced pressures below 1 atmosphere can be useful. The digested stream comprises glycol, bis(hydroxyalkyl)terephthalates, and oligomers thereof.

Catalyst

A catalyst can be used in the digestion reaction. In particular, suitable catalysts comprise tin, titanium, zinc, antimony, germanium, zirconium, or manganese. Specific examples include titanium alkoxides (e.g., tetrabutyl titanate or tetraisopropyl titanate), titanium(IV) phosphate, titanium (IV) tetrabutoxide, titanium (IV) tetrapropoxide, zirconium alkoxides, zinc acetate, manganese(II) acetate, antimony trioxide, germanium oxide, or the like, and mixtures thereof. Catalysts that do not significantly promote isocyanate reaction chemistries are preferred. Preferably, the catalyst is butyltin hydroxide oxide hydrate or a titanium alkoxide such as titanium t-butoxide. The amount of catalyst used is typically in the range of 0.005 to 5 wt. %, based on the total amount of polyol being prepared. Alternately, the amount of catalyst used is in the range of 0.01 to 1 wt. %, 0.02 to 0.7 wt. %, or 0.05 to 0.2 wt. %, based on the total amount of polyol being prepared.

Usually, the digestion reaction is performed by heating the polyacid source, glycols and any catalyst at least until the mixture is completely liquified and particles of the PET are no longer visible. Reaction times range from about 30 minutes to about 16 hours, more typically 1 to 10 hours, even more typically 3 to 8 hours, depending on the reaction temperature, source of the PET, the particular glycol reactant used, mixing rate, desired degree of depolymerization, and other factors that are within the skilled person's discretion.

The molar ratio of glycol to the polyacid source reactant is at least 0.8, preferably 1.0 to 6.0, more preferably 2.5 to 4.5. When the glycol/PET molar ratio is below 0.8, the hydrophobe-modified polyester products are often too hard to be digested. On the other hand, when the glycol/polyester source molar ratio is greater than about 6, then the resulting material is too hydrophilic with too high of a water solubility.

When the digested material is reacted with a hydrophobe, the reaction is performed under conditions effective to promote one or more of several different possible reactions between the digested intermediate and the hydrophobe, principally condensation reactions. For instance, hydroxyl groups in the digested intermediate can react with acid or ester groups in the hydrophobe to generate esters from the acids or new esters from the original ones. Because the hydrophobes often have hydroxyl functionality as well, new esters can be formed that utilize that hydroxyl functionality. Other kinds of reactions may occur, including crosslinking or cycloaddition reactions involving carbon-carbon double bonds and/or allylic hydrogens that were originally present in the hydrophobe.

Reactions between the digested stream and hydrophobe are typically performed by heating at temperatures within the range of 80° C. to 260° C. Alternately, the temperature range is 90° C. to 230° C., 100° C. to 220° C. or 110° C. to 210° C. Typically, the reaction is run at atmospheric pressure, although the reaction can be run at pressures between about 0 psia to about 100 psia, about 5 psia to about 75 psia, and about 7 psia to about 65 psia. When it is desirable to remove water, the reactor is preferably operated under vacuum, e.g., 0 psia to less than 14.7 psia, or alternately 5 psia to less than 14.7 psia, or 0 psia to 7 psia. Water generated in the reaction is normally removed from the reaction mixture as it forms. This is typically performed by vacuum stripping, wiped-film evaporation, sparging with dry air or nitrogen, and the like. The reaction is normally continued until a pre-determined amount of water has been collected or a target acid number and/or hydroxyl number is reached for the product.

When a hydrophobe is used in the production of the subject polyester polyol the amount of hydrophobe incorporated into the polyol is within the range of 2 to 70 wt. %. Alternately, the amount of hydrophobe in the polyol is 3 to 60 wt. % or 4 to 50 wt. %. When a hydrophobe is used, the polyester polyol can also be made in a single step by reacting the polyacid source, glycol, and hydrophobe under conditions effective to produce the polyol. When the single-step process is used, it is preferred to utilize a reflux system that returns condensed glycols to the reactor while allowing removal of water, as removal of too much glycol can result in cloudy or opaque polyols. Reaction temperatures in the single step process are as described above for the two-step process.

The polyester polyols produced by the above-described processes have hydroxyl numbers within the range of 15 to 800 mg KOH/g, preferably 35 to 600 mg KOH/g. Hydroxyl number can be measured by any accepted method for such a determination, including, e.g., ASTM E-222 ("Standard Test Methods for Hydroxyl Groups Using Acetic Anhydride Acetylation"). The polyols also have average hydroxyl functionalities (i.e., the average number of –OH groups per molecule) within the range of 0.25 to 2.8, preferably 0.5 to 2.0.

In some embodiments when used as a drilling fluid additive, the polyester polyols produced in the above-described process are flowable liquids at temperatures of 25 to 100° C., and have viscosities measured at 25° C. less than 100,000 cP, more preferably less than 30,000 cP, most preferably less than 20,000 cP. A preferred range for the polyol viscosity is 50 to 10,000 cP, more preferably 200 to 5,000 cP. Alternatively, when the polyester polyol is used as a carrier fluid, the polyol viscosity is preferably less than 100 cP, preferably less than 50 cP at 25° C. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

Wellbore Drilling Fluids

Drilling fluids are used as part of oil field drilling operations to perform a variety of tasks, and consist of a continuous phase, which is a liquid carrier fluid, and a discontinuous phase, which are solids or another dispersed liquid. Drilling fluid systems are generally classified as water-based when water is the carrier fluid. When the drilling fluid utilizes a non-aqueous fluid as the carrier fluid, it is classified as oil-based when the carrier fluid is an oil such as diesel, kerosene, or crude oil; or synthetic-based when the carrier fluid is mineral oils, biodegradable esters, olefins or similar fluids. The carrier fluid is typically present in the drilling fluid in an amount from 60.0 to 100.0 vol % of the liquid phase of the drilling fluid, preferably 70.0 to 85.0 vol % of the liquid phase of the drilling fluid.

The drilling fluid controls the formation pressure, removes cuttings from the borehole, cools and lubricates the drill bit, transmits hydraulic energy to the drill bit and maintains wellbore stability. Modern drilling fluids are carefully designed to perform all these functions, and require the incorporation of a variety of additives such as lubricants, viscosifiers, thickeners, emulsifiers, weighting agents, wetting agents and pH control materials. Drilling fluid additives can be present in the drilling fluid in an amount from 1.0 to 25.0 lb/bbl of drilling fluid, preferably, from 2.0 to 20.0 lb/bbl of drilling fluid, more preferably, 3.0 to 14.0 lb/bbl of drilling fluid.

Non Aqueous Fluid

The non-aqueous fluids used in the drilling fluids of the current disclosure are selected from diesel, paraffins, olefins, aromatics, crude oil, vegetable oils, esters of vegetable oils or mixtures thereof. When the non-aqueous fluid is a paraffin, the paraffins are preferably $C_{10}$ to $C_{22}$ linear, branched or cyclic alkanes. More preferably, the paraffin is a mineral oil.

When the non-aqueous fluid is an olefin, preferably the olefins are $C_{15}$ to $C_{18}$ linear, branched or cyclic alkenes.

The non-aqueous fluid can be Diesel (CAS No. 68334-30-5), Diesel No. 1, Diesel No. 2, and Diesel No. 4. Diesel is a middle distillate $C_9$-$C_{20}$ hydrocarbon, having a boiling point of 163 to 357° C. Diesel No. 1 (kerosene) is a $C_9$-$C_{16}$ material with a 150- 300° C. boiling point. Diesel No. 2 is a straight-run middle distillate having a boiling range of 160 to 360° C. Diesel No. 4 (CAS No. 68476-31-3) is also called marine diesel fuel. It is more viscous than Diesel No. 2 with higher levels of ash and sulfur.

The non-aqueous fluid can also be a vegetable oil or an ester of a vegetable oil. Preferably, the vegetable oils are selected from palm oil, canola oil, soybean oil, olive oil, castor oil, cotton seed oil, linseed oil, safflower oil, sunflower oil, rapeseed oil, tall oil, corn oil, or mixtures thereof. More preferably, the vegetable oils are selected from palm oil, canola oil, soybean oil or mixtures thereof.

Weighting Agent

The drilling fluid of the current disclosure can contain weighting agents. These compounds are used to increase the drilling fluid density so that wellbore pressure is equilibrated with the formation pressure. The weighting agent is selected from barite, siderite, celesite, dolomite, calcite, galena, hematite, magnetite, iron oxide, ilmenite, silica, gilsonite or mixtures thereof. The weighting agent is typically present in the drilling fluid in an amount up to 500 lb/bbl of drilling fluid.

pH Control Agent

The drilling fluid can contain pH control agents when a water based system is used. These compounds are used to prevent corrosion and corrosion/erosion mechanisms from weakening or destroying metallic parts of pumps, piping and other equipment. The pH control agent can be selected from alkaline earth salts. Preferably, the pH control agent is selected from lime, calcium chloride of mixtures thereof. The pH control agent is typically present in the drilling fluid in an amount from 2 to 14 lb/bbl of drilling fluid.

Emulsifier

The drilling fluid can contain emulsifiers. Emulsifiers are required to form a stable dispersion of water droplets in an oil phase (invert emulsion mud). The emulsifier is selected from phospho-glyco lipids, phospho-glyco triglycerides, oxidized natural oils, calcium or magnesium fatty-acid soaps made from various fatty acids and lime; or derivatives thereof such as amides, amines, amidoamines and imidazolines or mixtures thereof. The emulsifier is typically present in the drilling fluid in an amount from 4 to 20 lb/bbl of drilling fluid.

Thickener/Viscosifier

The drilling fluid can contain thickeners or viscosifiers. Thickeners and viscosifiers aid in the suspension of cuttings and weight materials in the wellbore drilling fluid. The viscosifier is selected from guar gum powder, bentonite, hydroxyethyl cellulose, sepiolite, scleroglucan, polyanionic celluloses, attapulgite, xanthan gum, aluminosilicates, starches, hydrous magnesium silicates or hydrous magnesium aluminum silicate, carboxymethyl cellulose or mixtures thereof. Thickeners are selected from organophilic clays, gilsonite and asphaltic materials. The thickeners and viscosifiers are typically present in the drilling fluid in an amount from 1.0 to 25.0, preferably 2.0 to 20.0, more preferably, 3.0 to 14.0 lb/bbl of drilling fluid.

Wetting Agent

The drilling fluid can contain wetting agents. Wetting agents are used as surface active agents for reducing the sticking tendencies of solids in the drilling mud, such as clay and shale. They prevent problems in the drilling operation such as fouling of the drill bit. The wetting agents are selected from phospho-glyco lipids, phospho-glyco triglycerides, oxidized natural oils, calcium sulfonate, dodecylbenzenesulfonic acid diethanolamide, fatty acid copolymers of natural oils, fatty acid soaps of natural oils, stearates, imidoamines, imidazolines, lime or mixtures thereof. The wetting agent is typically present in the drilling fluid in an amount from 2 to 14 lb/bbl of drilling fluid.

Lubricants

The drilling fluid can contain lubricants when used in water-based systems, Lubricants are used in the drilling operation to lower the lubricity coefficient, in order to reduce torque requirements of the drill bit. Lubrication liquids used for lubricating the drill bit or other drill components can be either water-based or oil-based. During oil- based drilling, typical lubricants include diesel oil, synthetic oil, biodiesel, vegetable oils, fatty acid partial glycerides, polyglycerols or mixtures thereof. The lubricant is typically present in the drilling fluid in an amount from 2 to 14 lb/bbl of drilling fluid.

Preparation of the Drilling Fluids

The drilling fluids are prepared by combining the carrier fluid and the additives with mixing in accordance with the American Petroleum Institute publication RP13 I, Standard Procedure form Laboratory Testing Drilling Fluids, 8th Edition March 2009.

EXAMPLES

The following examples merely illustrate the invention; the skilled person will recognize many variations that are within the spirit of the invention and scope of the claims.

Control Example 1

Drilling Fluid Formulation

A drilling fluid was prepared containing ESCAID 110, a hydrocarbon carrier fluid, commercially available from ExxonMobil; AES MUL, an emulsifier commercially available from AES Drilling Fluids, LLC; AES WA, a wetting agent, commercially available from AES Drilling Fluids, LLC; a 25% calcium chloride solution commercially available from Solvay Chemicals; Geltone II, a viscosifier commercially available from Halliburton; Gilsonite, a weighting agent commercially available from American Gilsonite Inc.; and Barite, a weighting agent commercially available from Excalibur Minerals LLC. The quantities of the various components and preparation procedure are summarized in Table I. The mixing protocol used is as described in API 131.

TABLE 1

| Material | Amount Added | Procedure |
|---|---|---|
| ESCAID 110 | 177 grams | Add the ESCAID 110 to the mixing container. |
| AES MUL | 6 grams | Slowly add AES MUL and let mix for 5 minutes. |
| AES WA | 6 grams | Slowly add AES WA and let mix for 5 minutes. |
| 25% Calcium Chloride | 98.2 grams | Slowly add 25% calcium chloride solution and mix for 5 minutes. |
| Lime | 3 grams | Slowly add Lime and let mix for 5 minutes. |
| Geltone II | 8 grams | Slowly add Geltone II and let mix for 5 minutes. |
| Gilsonite | 6 grams | Slowly add Gilsonite and mix for 5 minutes. |
| Barite | 125 grams | Slowly add Barite and let mix for 30 minutes. |

Control Example 2

Rheology Profile of Control Example 1

Fann 35 rheology profiles of Control Example 1 were determined at atmospheric pressure and various temperature points using a Fann Instruments Fann 35 Rheometer. The Fann 35 dial readings were recorded at 600 rpm, 300 rpm, 200 rpm, 100 rpm, 6 rpm, and 3 rpm, and the viscosities calculated by the equation: Viscosity (cP)=300*(dial reading)/(rpm). The highest dial reading recorded at 3 rpm after 10 seconds and 10 minutes were recorded as the 10 second and 10 minute gel strengths. The yield point and plastic viscosity are calculated using the 600 rpm and 300 rpm dial reading. Results are shown in Table 2 and FIG. 1.

TABLE 2

| Temp °F. | Pres. psia | 600 rpm Visc. cP | 300 rpm Visc. cP | 200 rpm Visc. cP | 100 rpm Visc. cP | 6 rpm Visc. cP | 3 rpm Visc cP | 10-sec gel lb/100 sq. ft. | 10-min gel lb/100 sq. ft. | Plastic Visc. cP | Yield Point lb/100 sq. ft. |
|---|---|---|---|---|---|---|---|---|---|---|---|
| 40 | 15 | 39 | 45 | 48 | 54 | 250 | 400 | 6 | 9 | 34 | 11 |
| 70 | 15 | 28 | 30 | 41 |  | 200 | 300 | 5 | 9 | 26 | 4 |
| 150 | 15 | 17 | 23 | 26 | 36 | 350 | 500 | 7 | 11 | 11 | 12 |

The results of Table 2 were obtained by using the commercial fluid Escaid-110 and employing Geltone II as the viscosifier or the thickening agent. The Fann 35 viscometer results at the different rpm demonstrates that the fluid does not lose its integrity as a function of temperature, and that the Yield Point (YP) remains fairly consistent as the temperature changes from 40° F. and 150° F.

FIG. 1 presents the plot of Viscosity measured in cP (on the Y-axis) of Control Example 2 at the three temperatures 40, 70 and 150° F. plotted against the various rpm values (X-axis). The viscosity profiles for Control Example 2 at the three different temperatures appear to follow closely, and the gradient is virtually Newtonian between 100 and 600 rpm at 40° F. Similarly, at the higher temperatures (70 and 150° F.), the higher shear rates do not dramatically influence the viscosity, consequently demonstrating little effect on the Yield Point.

Example 3

Aromatic Polyester Polyol Drilling Fluid Additive Containing Dimer Fatty Acid A drilling fluid additive was prepared as follows. Titanium (IV) butoxide (0.1 wt % of the total formulation) was charged to a four neck round bottom reaction vessel, followed by addition of recycled polyethylene terephthalate (rPET) pellets (28.74 wt %). Then, recycled propylene glycol (31.89 wt %) used in the digestion for the aromatic polyester polyols was added. The reaction vessel was set up with an overhead mixer, stir bearing, stir shaft, and stir blade for agitation during reaction. The reactor was also equipped with a water condenser, thermal probe at liquid level, and a source of dry nitrogen regulated by an acrylic flowmeter (0.4-2 SCFH). The reactor system was placed on a heating mantle, ensuring that all joints are sealed properly with silicone-free grease. Water flow through the condenser was turned on, and nitrogen flow to the reactor was regulated at 0.4 -2 SCFH with an acrylic flowmeter to sufficiently purge the reactor of any residual water and/or oxygen. Heating was begun at this stage, with the temperature controller set to 200° C., along with slow agitation of around 100-150 rpm. Once the polyol became an homogenous mixture with no pellets or flakes remaining, the heating source was removed and the reaction allowed to cool to just below 100° C., prior to the addition of dimerized fatty acid at 39.27 wt % through the neck of the reaction vessel. Agitation was maintained at 300-400 rpm. After this addition, a Dean Stark trap was incorporated into the reactor system where the condenser meets the reaction vessel. Subsequently, the heat was reduced to 185° C. with slow agitation. The heating was continued by incrementally increasing the temperature by 5° C. every 30 minutes until the reaction reached a final temperature of 200° C. The reaction temperature was maintained at 200° C. until the acid value was <2.0, as measured by ASTM D4662. When the acid value was below 2.0 the reaction was considered complete.

Example 4

Drilling Fluid Formulation Containing Aromatic Polyester Polyol Additive

A drilling fluid was prepared as in Control Example 1 except that drilling fluid additive Example 3 replaced Geltone II. Quantities and procedures for preparing the example are summarized in Table 3.

TABLE 3

| Material | Amount Added | Procedure |
|---|---|---|
| ESCAID 110 | 177 grams | Add the ESCAID 110 to the mixing container. |
| AES MUL | 6 grams | Slowly add AES MUL and let mix for 5 minutes. |
| AES WA | 6 grams | Slowly add AES WA and let mix for 5 minutes. |
| 25% Calcium Chloride | 98.2 grams | Slowly add 25% calcium chloride solution and mix for 5 minutes. |
| Lime | 3 grams | Slowly add Lime and let mix for 5 minutes. |
| Example 3 | 8 grams | Slowly add Example 3 and let mix for 5 minutes. |
| Gilsonite | 6 grams | Slowly add Gilsonite and mix for 5 minutes. |
| Barite | 125 grams | Slowly add Barite and let mix for 30 minutes. |

Example 5

Rheology Profile of Drilling Fluid Formulation Example 3

Fann 35 rheology profiles of Example 4 were determined at atmospheric pressure and various temperature points, and the viscosities calculated as in Control Example 2. Results are shown in Table 4 and FIG. 2.

TABLE 4

| Temp °F. | Pres. psia | 600 rpm Visc. cP | 300 rpm Visc. cP | 200 rpm Visc. cP | 100 rpm Visc. cP | 6 rpm Visc. cP | 3 rpm Visc cP | 10-sec gel lb/100 sq. ft. | 10-min gel lb/100 sq. ft. | Plastic Visc. cP | Yield Point lb/100 sq. ft. |
|---|---|---|---|---|---|---|---|---|---|---|---|
| 40 | 15 | 24 | 31 | 36 | 48 | 350 | 600 | 10 | 12 | 16 | 15 |
| 70 | 15 | 16 | 19 | 21 | 27 | 200 | 300 | 8 | 10 | 13 | 6 |
| 150 | 15 | 9 | 12 | 15 | 16 | 100 | 200 | 3 | 4 | 7 | 4 |

In Table 4, inventive Example 3 was used in lieu of Geltone II. The results were unexpectedly similar to those obtained with Geltone II as the thickener. Here too, the Yield Point remained consistent between 70° F. and 150° F., even though there was a significant drop from the result obtained at 40° F. Nevertheless, there isn't a substantial drop in solution viscosities measured at 600 rpm between 40° F. and 150° F.

Figure 2:
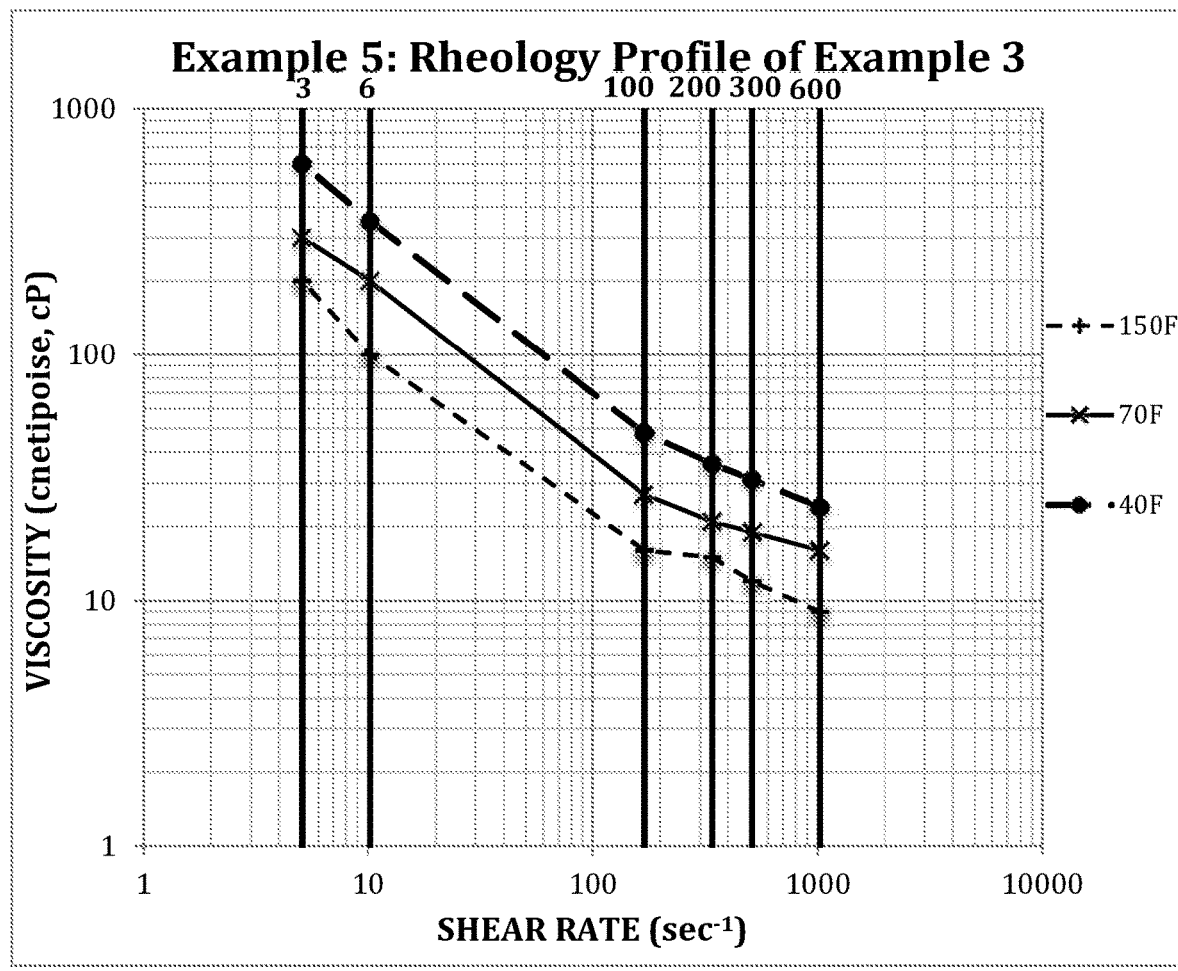
FIG. 2 illustrates the viscosity profile plot of the Example 5.

FIG. 2 illustrates the viscosity profile plot of the Example 5. In this instance too, where Geltone II has been replaced with Example 3, the profile appears to follow an analogous trend to Control Example 2.

Example 6

Drilling Fluid Formulation Containing Aromatic Polyester Polyol Additive

A drilling fluid was prepared as in Control Example 1 except that drilling fluid additive Example 3 replaced ESCAID 110. Quantities and procedures for preparing the example are summarized in Table 5.

TABLE 5

| Material | Amount Added | Procedure |
|---|---|---|
| ESCAID 110 | 100 grams | Add the ESCAID 110 to the mixing container. |
| Example 3 | 77 grams | Add Example 3 in conjunction with ESCAID-110 |
| AES MUL | 6 grams | Slowly add AES MUL and let mix for 5 minutes. |
| AES WA | 6 grams | Slowly add AES WA and let mix for 5 minutes. |
| 25% Calcium Chloride | 98.2 grams | Slowly add 25% calcium chloride solution and mix for 5 minutes. |
| Lime | 3 grams | Slowly add Lime and let mix for 5 minutes. |
| Gilsonite | 6 grams | Slowly add Gilsonite and mix for 5 minutes. |
| Barite | 125 grams | Slowly add Barite and let mix for 30 minutes. |

Example 7

Rheology Profile of Drilling Fluid Formulation Example 3

Fann 35 rheology profiles of Example 6 were determined at atmospheric pressure and various temperature points, and the viscosities calculated as in Example 3. Results are shown in Table 6, and FIG. 3.

TABLE 6

| Temp °F. | Pres. psia | 600 rpm Visc. cP | 300 rpm Visc. cP | 200 rpm Visc. cP | 100 rpm Visc. cP | 6 rpm Visc. cP | 3 rpm Visc cP | 10-sec gel lb/100 sq. ft. | 10-min gel lb/100 sq. ft. | Plastic Visc. cP | Yield Point lb/100 sq. ft. |
|---|---|---|---|---|---|---|---|---|---|---|---|
| 40 | 15 | 165 | 168 | 171 | 192 | 800 | 1200 | 14 | 14 | 162 | 6 |
| 70 | 15 | 139 | 162 | 174 | 198 | 700 | 1000 | 16 | 16 | 116 | 46 |
| 150 | 15 | 74 | 98 | 120 | 174 | 1000 | 1600 | 18 | 20 | 50 | 48 |

Figure 3:
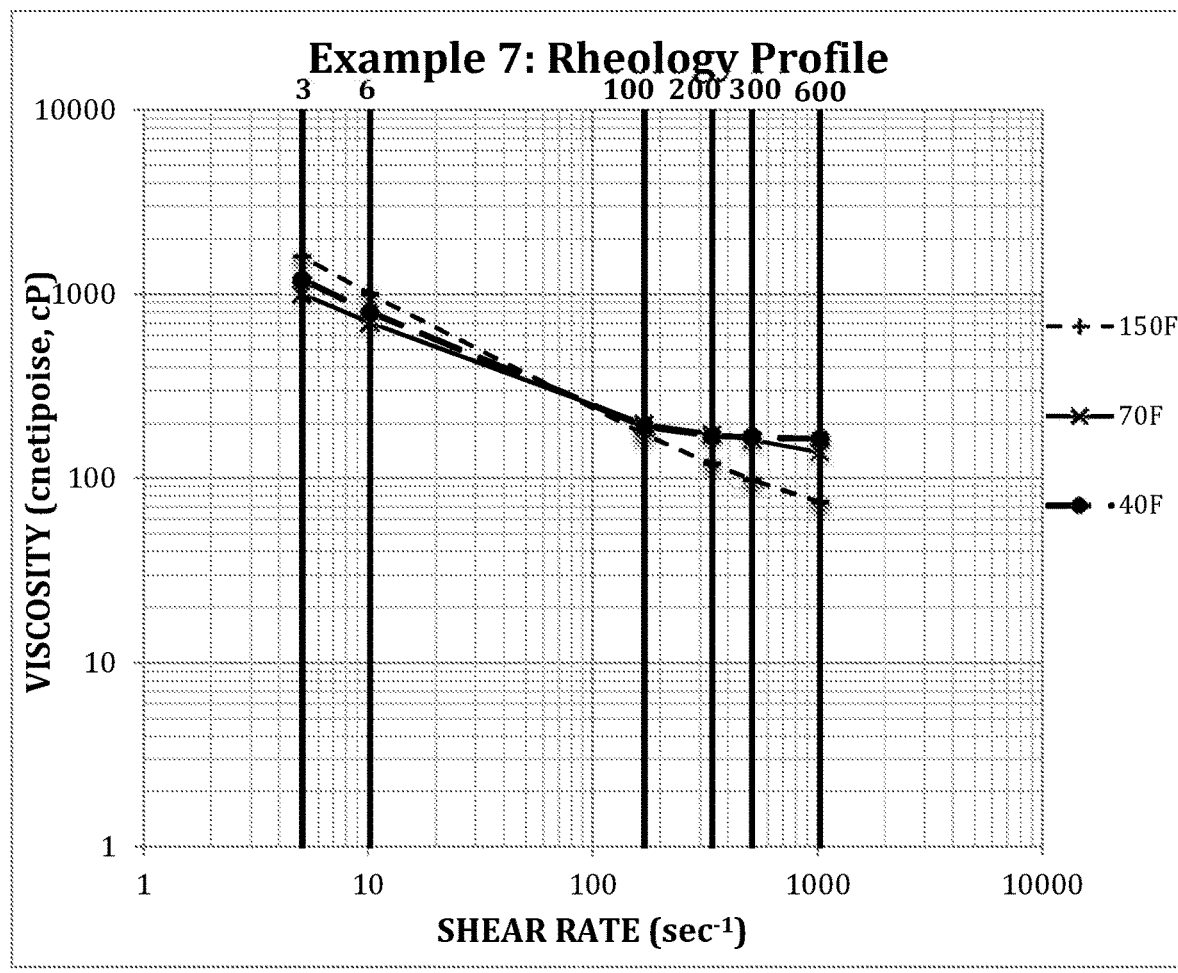
FIG. 3 illustrates the viscosity profile plot of the Example 7.

In FIG. 3, which illustrates the viscosity profile plot of Example 7, it is seen that when Example 3 is added in conjunction with the commercial fluid with no Geltone II in the formulation, the Newtonian behavior is much more manifest between 100 rpm and 600 rpm at practically every temperature.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A drilling fluid comprising:
    a carrier fluid;
    an aromatic polyester polyol, produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol; and
    an additive selected from a thickener, a wetting agent, an emulsifier, a weighting agent, a pH control agent, a lubricant or mixtures thereof.

2. The drilling fluid of claim 1 wherein the carrier fluid is a non-aqueous fluid selected from selected from diesel, diesel fuel no. 1, diesel fuel no. 2, diesel fuel no. 4, paraffins, olefins, aromatics, crude oil, vegetable oils, esters of vegetable oils or mixtures thereof.

3. The drilling fluid of claim 2 wherein the paraffins are $C_{10}$ to $C_{22}$ linear, branched or cyclic alkanes.

4. The drilling fluid of claim 2 wherein the olefins are $C_{15}$ to $C_{18}$ linear, branched or cyclic alkenes.

5. The drilling fluid of claim 2 wherein the non-aqueous fluid is diesel.

6. The drilling fluid of claim 2 wherein the vegetable oils are selected from palm oil, canola oil, soybean oil, olive oil, castor oil, cotton seed oil, linseed oil, safflower oil, sunflower oil, rapeseed oil, tall oil, corn oil, or mixtures thereof.

7. The drilling fluid of claim 6 wherein the vegetable oil is selected from palm oil, canola oil, soybean oil or mixtures thereof.

8. The drilling fluid of claim 2 wherein the paraffin is mineral oil.

9. The drilling fluid of claim 1 wherein the aromatic polyester polyol is present in an amount from 1.0 to 25.0 lb/bbl of the drilling fluid.

10. The drilling fluid of claim 9 wherein the aromatic polyester polyol is present in an amount from 2.0 to 20.0 lb/bbl of the drilling fluid.

11. The drilling fluid of claim 1 wherein the weighting agent is selected from barite, siderite, celesite, dolomite, calcite, galena, hematite, magnetite, iron oxide, ilmenite, silica, or mixtures thereof.

12. The drilling fluid of claim 1 wherein the wetting agent is selected from phospho-glyco lipids, phospho-glyco triglycerides, oxidized natural oils, calcium sulfonate, dodecybenzenesulphonic acid diethanolamide, fatty acid copolymers of natural oils, fatty acid soaps of natural oils, stearates, imidoamines, imidazolines, lime or mixtures thereof.

13. The drilling fluid of claim 12 wherein the natural oils are selected from tall oil, palm oil, canola oil, soybean oil, olive oil, castor oil, cotton seed oil, linseed oil, safflower oil, sunflower oil, rapeseed oil, corn oil, or mixtures thereof.

14. The drilling fluid of claim 1 wherein the emulsifier is selected from phospho-glyco lipids, phospho-glyco triglycerides, oxidized natural oils, or mixtures thereof.

15. The drilling fluid of claim 1 wherein the pH control agent is selected from alkaline earth metal salts.

16. The drilling fluid of claim 15 where the alkaline earth metal salt is lime or calcium chloride.

17. The drilling fluid of claim 1 wherein the lubricant is selected from diesel oil, synthetic oil, biodiesel, vegetable oils, fatty acid partial glycerides, polyglycerols or mixtures thereof.

18. A carrier fluid comprising:
a non-aqueous liquid selected from selected from diesel, diesel fuel no. 1, diesel fuel no. 2, diesel fuel no. 4, paraffins, olefins, aromatics, crude oil, vegetable oils, esters of vegetable oils or mixtures thereof; and
a polyester polyol selected from aromatic polyester polyols produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol.

19. A thickener for a drilling fluid selected from aromatic polyester polyols produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol.

20. A process for thickening a drilling fluid, the process comprising adding the thickener of claim 19 to the drilling fluid.

21. A process comprising combining:
a carrier fluid;
an aromatic polyester polyol, produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol; and
an additive selected from a thickener, a wetting agent, an emulsifier, a weighting agent, a pH control agent, a lubricant or mixtures thereof,
thereby forming a drilling fluid.

22. A process comprising drilling a wellbore with a drilling fluid comprising:
a carrier fluid;
an aromatic polyester polyol, produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol; and
an additive selected from a thickener, a wetting agent, an emulsifier, a weighting agent, a pH control agent, a lubricant or mixtures thereof.

23. A drilling fluid comprising:
an aromatic polyester polyol, produced by reacting a recycled PET stream with glycol and a catalyst to form a digested material wherein the digested material is completely liquified, and then reacting the digested material with a hydrophobe, the aromatic polyester polyol having a hydroxyl number in the range of 15 to 800 mg KOH/g, and where the hydrophobes are present in the aromatic polyester polyol within the range of 2.0 to 70.0 wt % based on the total weight of the aromatic polyester polyol; and
an additive selected from a thickener, a wetting agent, an emulsifier, a weighting agent, a pH control agent, a lubricant or mixtures thereof.

24. The drilling fluid of claim 23 wherein the aromatic polyester polyol is present in an amount from 60.0 to 100.0 vol % of the liquid phase of the drilling fluid.

25. The drilling fluid of claim 24 wherein the aromatic polyester polyol is present in an amount from 70.0 to 85.0 vol % of the liquid phase of the drilling fluid.

26. The drilling fluid of claim 10 wherein the aromatic polyester polyol is present in an amount from 3.0 to 14.0 lb/bbl of the drilling fluid.

* * * * *